United States Patent [19]

Nicia

[11] Patent Number: 4,852,962
[45] Date of Patent: Aug. 1, 1989

[54] OPTICAL FIBER SWITCH USING NEMATIC CRYSTAL TO SWITCH UNPOLARIZED OPTICAL SIGNALS

[75] Inventor: Antonius J. A. Nicia, Eindhoven, Netherlands

[73] Assignee: U.S. Philips Corporation, New York, N.Y.

[21] Appl. No.: 411,928

[22] Filed: Aug. 26, 1982

[30] Foreign Application Priority Data

Sep. 7, 1981 [NL] Netherlands ............... 8104122

[51] Int. Cl.$^4$ ............... G02B 6/36; G02F 1/13
[52] U.S. Cl. ............... 350/96.20; 350/96.13; 350/96.14; 350/96.16; 350/96.18; 350/334; 350/338; 350/335; 350/347 V; 350/370; 350/356
[58] Field of Search ............... 350/96.13, 96.14, 96.15, 350/96.16, 96.18, 96.17, 96.20, 330, 334, 335, 347 V, 338, 389, 356, 402, 370

[56] References Cited

U.S. PATENT DOCUMENTS

| | | | |
|---|---|---|---|
| 3,591,254 | 7/1971 | Browne et al. | 350/358 |
| 3,993,400 | 11/1976 | Leib | 350/96.13 |
| 4,120,560 | 10/1978 | Baues et al. | 350/347 V |
| 4,278,327 | 7/1981 | McMahon et al. | 350/96.14 |
| 4,343,535 | 8/1982 | Bleha, Jr. | 350/342 |
| 4,385,799 | 5/1983 | Soref | 350/96.13 |
| 4,516,837 | 5/1985 | Soref et al. | 350/96.20 X |
| 4,702,557 | 10/1987 | Beckmann et al. | 350/347 V X |
| 4,720,171 | 1/1988 | Baker | 350/347 V X |
| 4,763,969 | 8/1988 | Khoe et al. | 350/96.16 X |
| 4,781,426 | 11/1988 | Baker | 350/96.16 |
| 4,784,470 | 11/1988 | Baker | 350/347 V X |
| 4,789,228 | 12/1988 | Le Pesant et al. | 350/96.15 X |
| 4,790,633 | 12/1988 | Baker | 350/347 V |
| 4,792,212 | 12/1988 | Baker | 350/347 V |

FOREIGN PATENT DOCUMENTS

| | | | |
|---|---|---|---|
| 56-150725 | 11/1981 | Japan | 350/330 |
| 1534456 | 12/1978 | United Kingdom | 350/347 V |

OTHER PUBLICATIONS

Wagner et al, "Electrically Controlled . . . Applications", Applied Optics, vol. 19, No. 17, 9/80, pp. 2921-2925.
Iwamura et al., "Simple Polarisation . . . Systems", Electronics Lett., vol. 15, No. 25, 12/79, pp. 830-831.
Kmetz, "A Single Polarizer . . . Display", Proceedings of the SID, vol. 21, No. 2, 1980, pp. 63-65.

*Primary Examiner*—William L. Sikes
*Assistant Examiner*—Brian M. Healy

[57] ABSTRACT

The electro-optical switch in accordance with the invention comprises one or more nematic crystals (7) for the deflection of polarized light. In order to enable deflection of a light beam in two perpendicular directions by means of two electrically controllable crystals, the beam (4) of unpolarized light is converted into a beam (6) of polarized light in a low-loss manner.

15 Claims, 2 Drawing Sheets 4,852,962

OPTICAL FIBER SWITCH USING NEMATIC CRYSTAL TO SWITCH UNPOLARIZED OPTICAL SIGNALS

BACKGROUND OF THE INVENTION

The invention relates to an optical switch for the transmission of unpolarized light from an input optical fibre to one of several output optical fibres via an input lens system and an output lens system whereto the input and output fibres, respectively are optically coupled, and via at least one electrically controllable nematic crystal which determines, under the influence of an adjustable electric field, a path to be followed by the light between the input lens system and the output lens system, the switch comprising an optical device for dividing unpolarized light into two beams of linearly polarized light whose polarization directions are orthogonal.

An optical switch of this kind is known from "Applied Optics", Vol. 19, No. 17, September 1980, pages 2921–2925. This described optical switch is limited to two positions. Ths light from an input fibre is switched either to a second or to a third output optical fibre. For the switching of light from an input fibre to four eight or more output fibres, three, seven or even more switches of the described kind are required. This is a drawback, because the described switches are comparatively expensive.

It is an object of the invention to provide a switch whereby the light can be switched from one input fibre to any one of several output fibres.

To this end, the optical switch in accordance with the invention is characterized in that the switch comprises an optical element for rotating the polarization direction of one of the beams of linearly polarized light through an angle of 90°, the output fibres being arranged adjacent one another behind a single output lens system. In a switch of this kind, the linearly polarized light is deflected by the nematic crystal to an extent dependent on the intensity of the control voltage applied thereto, so that the light is directed, via the lens system, to one of several, for example from 3 to 8, adjacently situated output optical fibres.

SUMMARY OF THE INVENTION

A preferred embodiment of an optical switch in accordance with the invention is characterized in that there is provided a second nematic crystal in which the electric field is perpendicular to the electric field of the first crystal, between the first and the second crystal there being arranged an optical element for rotating the polarization direction of both beams of linearly polarized light through an angle of 90°. A switch of this kind offers the advantage that the light can be deflected in two mutually perpendicular directions, one each by each crystal, so that selectively one of a large number of output fibres can be optically coupled to the input fibre. Actually, the optical switch is the electro-optical analogue of the mechanical two-motion switches of older telephone exchanges.

BRIEF DESCRIPTION OF THE DRAWINGS

Embodiments in accordance with the invention will be described in detail hereinafter with reference to the drawings, in which.

DETAILED DESCRIPTION OF THE INVENTION

Figure 1:
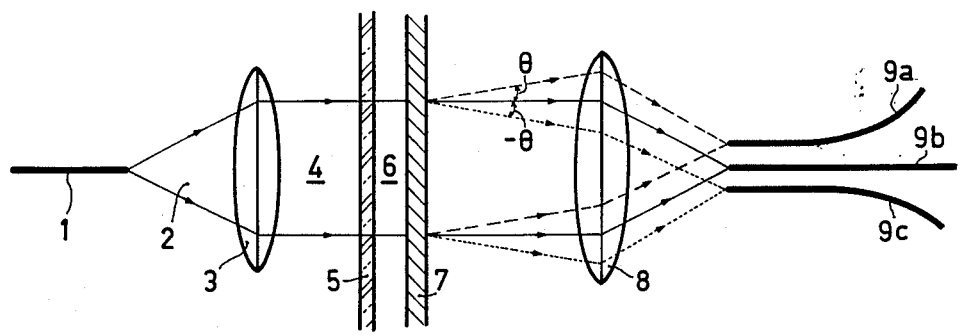
FIG. 1 diagrammatically shows the principle of the optical switch in accordance with the invention.

FIG. 1 shows the principle of an optical switch in accordance with the invention. An optical fibre 1 emits a diverging beam 2 of unpolarized light which is converted into a parallel light beam 4 by an input lens system 3. An optical device 5 converts the beam 4 of unpolarized light into a beam 6 of linearly polarized light which is incident on an electrically controllable nematic crystal 7. The linearly polarized light will be deflected to an extent dependent on the electric field strength between the electrodes provided on the crystal 7. Depending on the degree ($\theta$) and direction ($+\theta$ or $-\theta$) of deflection, the light is projected into one of the optical fibres 9a, b r c via an output lens system 8. Because the light is linearly polarized, all light is deflected in the same manner by the nematic crystal 7, so that high cross-talk attenuation and high switching efficiency are obtained.

Figure 2:
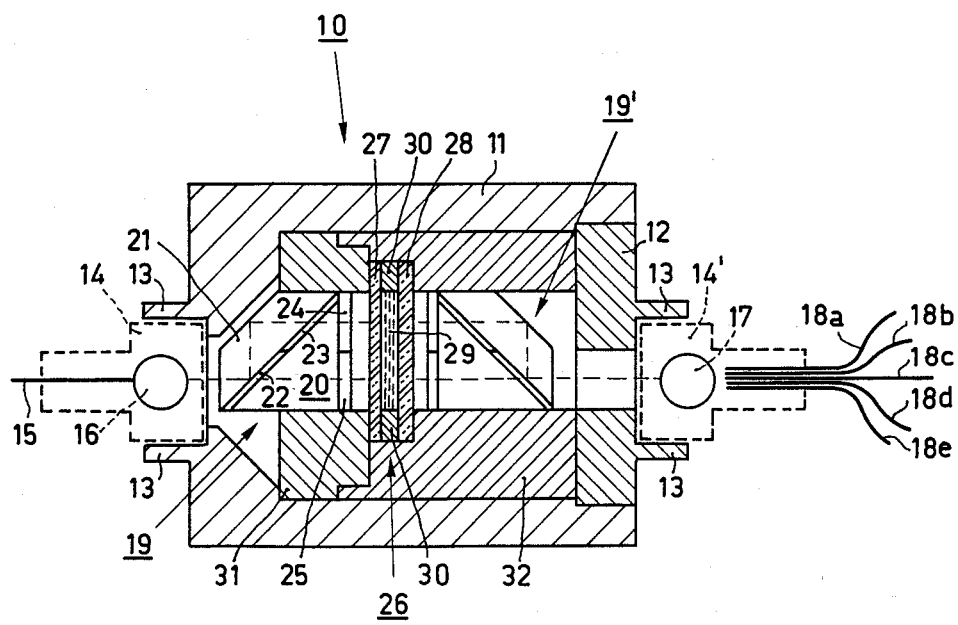
FIG. 2 shows a first embodiment of a switch in accordance with the invention.

FIG. 2 shows a first embodiment of an optical switch 10 in accordance with the invention. The switch 10 comprises a housing 11 and a cover plate 12 which are provided with known fastening means 13 for fastening the known optical connectors 14 and 14'. The input connector 14 contains one end of an optical input fibre 15 which is arranged opposite a spherical lens 16. The output connector 14' contains a row of several adjacently arranged ends of optical fibres 18a, b, c, d and e which are arranged opposite a spherical lens 17.

The lens 16 converts a divergent beam of unpolarized light emitted by the optical fibre 15 into a parallel beam of light which is incident on an optical device 19. The device 19 converts the beam of unpolarized light into two laterally displaced parallel beams of linearly polarized light having the same polarization direction. To this end, the device 19 comprises two prisms 20 and 21 wherebetween a polarizing filter 22 is arranged. The space remaining between the prisms 20 and 21 is filled with a glass plate 23 which has the same reflective index as the two prisms. The light beam from the lens 16 is incident on the filter 22 and is divided into two beams of linearly polarized light whose polarization directions are mutually perpendicular. The light reflected by the filter 22 is again reflected in the prism 21, passes through the glass plate 23 and subsequently passes through an optical element 24 in the form of a plate of crystalline quartz ($\lambda/2$ plate). The element 24 rotates the polarization direction of the light beam through an angle of 90°, so that the beam has the same polarization and propagation direction as the light beam transmitted by the filter 22. The two light beams pass through a deflection device 26 which comprises a nematic crystal which consists of two glass plates 27 and 28, nematic crystal material 29 and spacers and electrode holders 30. The electrodes have an elongate shape and extend at right angles to the plane of the drawing. They are arranged on the electrode holders on both sides of the holders and in pairs to the side of the light beams. Each electrode pair is controlled by an independent voltage source. If the intensity of the electric fields produced on the two sides of the beams differ, different orientations of the nematic crystal material occur across the beams. Consequently, a continuous gradient of refractive index is formed across the light beams. As a result of this refractive index gradient the light beams are deflected via an optical device 19' identical to the device 19. After beam formation and delinearization of the polarization, the beam is incident on the lens 17 in order to be received by one of the fibres 18a, b, c or d. Depending on the difference in field strength between the two electrode pairs the light beams are deflected through a larger or smaller angle.

The optical device 19 is secured in a support 31 which itself is secured in a support 32. Both supports 31 and 32 are located in the housing 11 by means of the cover plate 12. The deflection device 26 and the optical device 19' are secured in the support 32. On the side of the λ/2 plate 24 there is secured a glass filler plate 25 so that when the plates 24 and 25 are slid against the glass plate 27, loss of light due to reflections from glass/air transitions is avoided.

The use of the device 19' after deflection of the light beams, is not necessary for making the light non-linearly polarized again. The linearly polarized light may also be passed through a lens at least twice as large as lens 17 and onto a correspondingly thicker fibre. This may give rise to problems in view of available diameters of optical fibres which may have been standarized.

Figure 3:
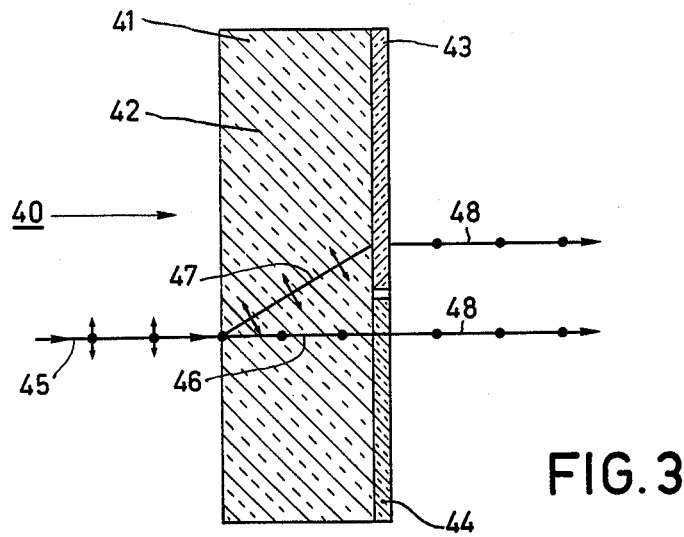
FIG. 3 shows a device for substantially loss-free conversion of unpolarized light into polarized light, and FIGS. 4a and b show further embodiments of an optical switch in accordance with the invention.

FIG. 3 shows a further optical device 40 for the substantially loss-free conversion of unpolarized light into linearly polarized light. The device 40 comprises a plate 41 of a calcite whose optical axis 42 encloses an angle with respect to a light beam 45 which is incident perpendicularly on the plate 41, said angle being determined by the arc tangent of the quotient of the extraordinary and the ordinary refractive indices. The beam 45 of unpolarized light, denoted by • and ↕, where •,↕ mean polarized perpendicularly to the plane of drawing and in the plane of drawing, respectively, is divided into two parts by the double refraction of the light in the plate 41. The non-deflected beam 46 has a polarization direction which is perpendicular to the plane of the drawing and retains this direction after having passed through a glass filler plate 44. The deflected light beam 47 has a polarization which is situated in the plane of the drawing and, after having passed through a λ/2 plate of crystalline quartz 43, it has the same polarization direction as the light beam 46. The optical element 40 thus converts the light beam 45 into two beams 48 of linearly polarized light.

Figure 4A:
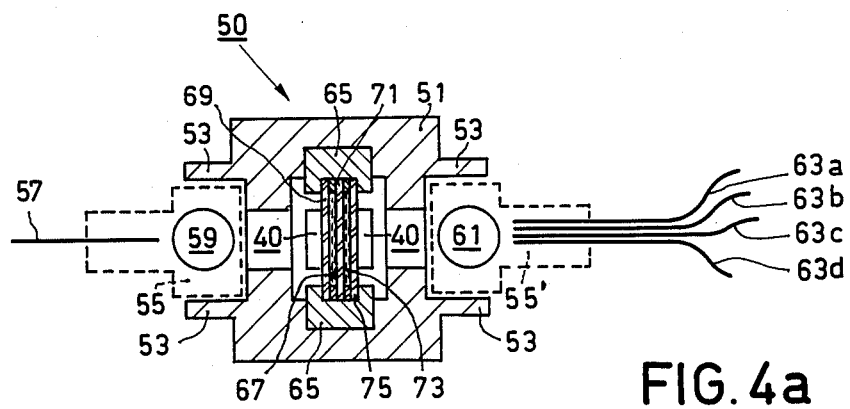

FIG. 4a shows a further embodiment of an optical switch 50 in accordance with the invention. The switch 50 comprises a housing 51 on which fastening means 53 are formed in known manner and to which known optical connectors 55 and 55' can be connected. The input connector 55 contains an input fibre 57 and a spherical lens 59. The output connector 55' contains a spherical lens 61 and a number of output fibres 63a, b c and d, though in practice this number may amount to 16 or more. The switch 50 also comprises a holder 65 in which two nematic crystals 67 and 73 are arranged between glass plates 69, 71 and 71, 75. The centre glass plate 71 itself is contructed of two glass plates enclosing a λ/2 plate of crystalline quartz. On both sides of the deflection device 67, 69, . . . 75 there is provided an optical device 40 for converting unpolarized light into linearly polarized light and vice versa.

The device 40 converts light introduced via the optical fibre 57 and the lens 59 into beams of linearly polarized light which are deflected in a first direction by the first nematic crystal 67 (if the field strengths generated by the pairs of electrodes on both sides of the light beams are different). The light beams having passed through the crystal 67 pass through the λ/2 plate (71), so that the polarization thereof is rotated through an angle of 90°. The light subsequently passes through the second crystal 73 whose electrodes, and hence the field strengths and the refractive index gradient produced thereby, are directed perpendicularly to the electrodes of the first crystal 67. The light is then deflected in a second direction perpendicular to the first direction. After having passed through the second device 40, the unpolarized light is received, via the lens 61, by one of the optical fibres 63a, b, c or d. The optical fibres 63a, b c and d are arranged in known manner in a hexagonal or rectangular matrix, adjacent one another in the connector 55'. The end faces of the fibres 63a, b, c and d form a two-dimensional surface whereon the light is projected via the lens 61. The deflections of the light in the crystals 67 and 73 determine the area of the surface whereunto the light is directed or, in other words, which fibre receives the light.

Figure 4B:
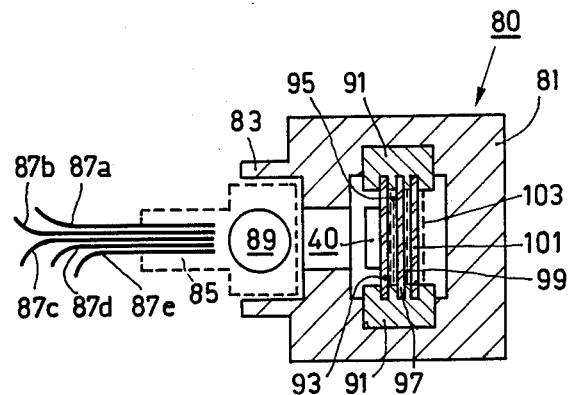

FIG. 4b shows a further embodiment of an optical switch 80 in accordance with the invention. The housing 81 of the switch 80 comprises fastening means 83 for the connection of an optical connector 85 on only one side. of housing 81. The optical connector 85 comprises a lens 89 and an input fibre 87c which is surrounded by a two-dimensional stack of output fibres 87a, b, dand e. The number of output fibres 87a, bd and e shown is only small for clarity, the actual number of fibres being, for example, 18 in a hexagonal stack or 24 in a square, the input fibre 87c being centrally arranged in the stack. The light introduced into the housing 81 via the input fibre 87c and the lens 89 is incident on the optical device 40 which converts the light into two beams of linearly polarized light. The two light beams are deflected by the deflection device which is mounted in a holder 91 and which is substantially identical to the deflection device of the optical switch 50 of FIG. 4a. To this end, the deflection device comprises two nematic crystals 95 and 99 which are located between the glass plates 93, 97 and 97, 101, respectively. The glass plate 97 is composed of two further glass plates and a λ/2 plate for rotation of the polarization direction of the light through an angle of 90°.

The exterior surface of the glass plate 101 (the right hand surface in FIG. 4b) is coated with a reflective layer 103, so that the light deflected by the two crystals 95 and 99 is reflected. The light passes through the deflection device again and is further deflected before it is received in the unpolarized condition (due to the passage through the device 40) by one of the output fibres 87a, b, d or e via the lens 89. If neither of the two crystals 95 and 99 is actuated, the beam of light can be "received" again by the input fibre after reflection from the reflective exterior surface 103, so that none of the output fibres 87a, b d, or e receives light. The switch 80 thus has an "off" position.

It has been found that the use of the optical devices 40 in the optical switches 50, and 80 is not absolutely necessary. For example, when the device 40 are omitted in FIG. 4a (switch 50), the unpolarized light can be deflected in one direction only. Only one polarization direction is deflected in the first crystal and, after rotation of the polarization through an angle of 90° by λ/2 plate 71, the light polarized in the other direction will be deflected in the same direction. Using two crystals, a deflection in one dimension is thus possible, provided that both crystals have the same electrode construction, and field strength and hence the same refractive index gradient.

Deflection of an umpolarized light beam in two mutually perpendicular directions is possible if each of the two crystals comprises four pairs of electrodes. A first pair of electrodes of the first crystal deflects the light having a first polarization direction in the x-direction. The second pair of electrodes of the first crystal deflects light having a second polarization direction perpendicular to said first direction in the y-direction. After departure from the first crystal, the polarization of the light is rotated through an angle of 90° by the λ/2 plate. The light having a second polarization direction is also deflected in the x-direction, after polarization rotation through an angle of 90°, under the influence of the first pair of electrodes of the second crystal, whilst the light having the first polarization direction is deflected in the y-direction, after polarization rotation through an angle of 90°, by the second pair of electrodes of the second crystal. Two nematic crystals thus enable deflection of unpolarized light in two mutually perpendicular directions. It is to be noted that the geometrical arrangement of the first and also the second pairs of electrodes in the first and the second crystal is identical, and so are the electrical control voltages applied thereto.

What is claimed is:

1. An optical switch for transmitting unpolarized light from an input optical fiber to one of a plurality of output optical fibers, said switch comprising means for optically coupling the input and output fibers to said switch, means, disposed in the path of the unpolarized light emitted by the input fiber and coupled to said switch by said coupling means, for dividing the unpolarized light into two spatially separated, linearly polarized beams whose directions of polarization are orthogonal, a nematic crystal disposed between said dividing means and said output fibers and in the path of said beams, means for rotating the direction of polarization of linearly polarized light through an angle of 90°, said polarization rotating means being disposed between said dividing means and said nematic crystal and being arranged so as to rotate the direction of polarization of only one of said beams so that the linearly polarized light of said beams incident on said nematic crystal have the same direction of polarization, and electrode means for producing an adjustable electric field under the influence of which said nematic crystal changes the path of the light between the input and output fibers so as to direct the light from the input fiber to a selected one of the output fibers.

2. An optical switch as claimed in claim 1 wherein said dividing means comprises a flat plate of calcite and said rotating means comprises a flat plate of crystalline quartz, the propagation direction of the light being directed at right angles to the flat plate of calcite and enclosing an angle with respect to the optical axis of the flat calcite plate, which is determined by the arc tangent of the quotient of the extraordinary and the ordinary refractive indices.

3. The switch according to claim 1 including a pair of parallel transparent plates, said nematic crystal being disposed between said plates, and wherein said electrode means comprises four elongated electrodes arranged in pairs on either side of the path of the light passing through said nematic crystal in a plane generally normal to that path, each electrode pair being controlled by an independent voltage source.

4. The switch according to claim 1 or 3 wherein said coupling means includes an input lens arranged between the input fiber and said dividing means and an output lens arranged between said nematic crystal and the output fibers, said output lens being common to all of the output fibers.

5. The switch according to claim 1 or 3 comprising a second nematic crystal arranged between said first-named nematic crystal and the output fibers, and second electrode means for producing a second electric field which is perpendicular to said first-named electric field, and means disposed between said first-named crystal and said second crystal for rotating the polarization direction of the linearly polarized light through an angle of 90°.

6. The switch according to claim 5 wherein the input fibers and the output fibers are arranged in a single stack, said coupling means including a lens which is common to the input and output fibers and a mirror arranged on the side of said second crystal remote from said lens.

7. An optical switch comprising:
(a) polarizing beam splitter means having first and second faces, for separating an incident light beam of arbitrary polarization into first and second light beams with first and second orthogonal linearly polarized states respectively, said first light beam refracted to propagate along a first path, and said second light beam refracted to propagate along a second path,
(b) first reflector means positioned to deflect said second light beam along a path parallel to said first path,
(c) first polarization converter means positioned in said second path for rotating said light beam polarization from said second linearly polarized state to substantially said first linearly polarized state, and
(d) first and second electrically responsive path selector means positioned in said parallel paths of said first and second light beams for selecting one of a first plurality of optical paths for said first light beam and one of a second plurality of optical paths for said second light beam.

8. The optical switch of claim 7, wherein:
(a) said first reflector means comprises a prism having first and second planar surfaces and a third surface in oblique juxtaposition with said first and second surfaces, and
(b) said first surface is disposed in parallel superposition with said second face of said polarizing beam splitter means, such that said second light beam when incident on said first surface at an angle of incidence exceeding a critical angle of incidence is substantially totally reflected within said prism to emerge at said second surface.

9. An optical switch as set forth in claim 7 wherein said first polarization converter means comprises a one-half wave retardation plate.

10. An optical switch as set forth in claim 7 wherein said first polarization converter means is disposed between said first reflector means and said path selector means, positioned in said path of said deflected second light beam to propagate said light beam in said first linearly polarized state to said path selector means.

11. The optical switch as set forth in claim 7, further comprising:
    (a) first lens means positioned to receive said incident light beam of arbitrary polarization for collimating said light beam and providing an arbitrarily polarized collimated beam to said polarizing beam splitter, and
    (b) at least one of a plurality of second lens means positioned to receive at least one emergent polarized optical beam for focusing said beam upon a respective one of a plurality of output terminals.

12. The optical switch of claim 3, wherein said incident light beam is carried on an optical fiber, and said one of said output terminals is connected to an optical fiber.

13. In an optical switch of the type including polarizing beam splitter means having first and second faces, for separating an incident light beam of arbitrary polarization into first and second light beams with first and second orthogonal linearly polarized states respectively, said first light beam refracted to propagate along a first path, and said second light beam refracted to propagate along a second path, first reflector means positioned to deflect said second light beam along a path parallel to said first path, first polarization converter means positioned in said second path for rotating said light beam polarization from said second linearly polarized state to substantially said first linearly polarized state, the improvement comprising:
    (a) first and second electrically responsive path selector means positioned in said parallel paths of said first and second light beams for selecting one of a second plurality of optical paths for said second light beam, said optical paths selected to define a pair of like-polarized parallel first and second light beams,
    (b) second polarization converter means, positioned for rotating the polarization of said second light beam from said first linearly polarized state to substantially said second linearly polarized state, and
    (c) second reflector means positioned to deflect said second light beam to a path also incident upon first polarizing beam combiner means,
    (d) said first polarizing beam combiner means positioned in said parallel optical paths for combining said first and second light beams to form at least one arbitrarily polarized light beam.

14. The optical switch of claim 9, wherein:
    (a) said second reflector means comprises at least one of a plurality of prisms having respective first and second planar surfaces and a third planar surface in oblique juxtaposition with said first and second surfaces,
    (b) said second polarization converter means comprises at least one a plurality of polarization converter means further comprising one-half wave retardation plates,
    (c) said first polarizing beam combiner means comprises at least one of a plurality of polarizing beam combiner means, and
    (d) said first surface of said one of said second reflector means is respectively disposed in parallel superposition with said one of said second polarization converter means, positioned in said selected optical path of said second light beam in said second linearly polarized state and said second surface is of one of said second reflector means disposed in parallel superposition with a respective first face of said one of said plurality of polarizing beam combiner means, so that said second light beam when incident to said first surface of said first reflector means at an angle of incidence exceeding a first critical angle of incidence is substantially totally reflected within said reflector to emerge at said second surface of said first reflector means, and said second light beam when incident to said first surface is associated with said second reflector means at an angle of incidence exceeding a second critical angle of evidence is substantially totally reflected therein to emerge at said second surface of said second reflector means.

15. An optical switch as set forth in claim 9 wherein said second polarization converter means is disposed between one of said first or second path selector means and said second reflector means, positioned in said path of said second light beam emerging in said first linearly polarized state to propagate said beam to said second reflector means.

* * * * *